United States Patent [19]

Brettler

[11] 4,351,302

[45] Sep. 28, 1982

[54] METHOD AND APPARATUS FOR REDUCING AUTOMOTIVE POLLUTION

[75] Inventor: David H. Brettler, Riverdale, N.Y.

[73] Assignee: Brett Enterprises, Inc., Silver Spring, Md.

[21] Appl. No.: 301,272

[22] Filed: Sep. 11, 1981

[51] Int. Cl.$^3$ .......................................... F23L 17/02
[52] U.S. Cl. ..................................... 123/566; 123/567
[58] Field of Search ................. 55/17, 406, 438, 439, 55/454, 391; 123/566, 567, 536, 539

[56] References Cited

U.S. PATENT DOCUMENTS

| | | | |
|---|---|---|---|
| 1,767,422 | 6/1930 | Woolson | 123/566 |
| 1,823,811 | 9/1931 | Watkins | 123/566 |
| 3,757,751 | 9/1973 | Kitchen | 123/566 |
| 3,948,234 | 4/1976 | Shumaker | 123/566 |
| 4,249,500 | 2/1981 | Behrendt | 123/556 |
| 4,273,564 | 6/1981 | Sugie | 123/556 |

FOREIGN PATENT DOCUMENTS

| | | | |
|---|---|---|---|
| 743192 | 5/1943 | Fed. Rep. of Germany | 123/566 |
| 584762 | 2/1925 | France | 123/566 |
| 253698 | 6/1926 | United Kingdom | 123/566 |

Primary Examiner—Ronald H. Lazarus
Attorney, Agent, or Firm—Berman, Aisenberg & Platt

[57] ABSTRACT

Apparatus for reduction of pollutant emissions by internal combustion engines includes a tapered, coaxial multiconical structure used as a gas separator. The gas separator is used to provide oxygen enriched air to an engine, thus providing a reduction in the amount of nitrogen provided thereto. The resulting exhaust gas includes fewer oxides of nitrogen, reduced quantities of hydrocarbons, and decreased percentages of carbon monoxide. Air is directed through the structure, entering at a wide mouth thereof. A fan may be provided for directing the air through the structure. The air exiting at the central portion of the narrow end of the structure, which has an increased ratio of oxygen to nitrogen, is directed by a conduit to the engine inlet. The structure is inexpensive, and easily mounted on existing engines, thus providing a retrofitting device for conforming older cars to current pollution standards.

3 Claims, 5 Drawing Figures

METHOD AND APPARATUS FOR REDUCING AUTOMOTIVE POLLUTION

BACKGROUND OF THE INVENTION

1. Field of the Invention

This invention relates to devices for reducing the concentration of pollutants in exhaust emissions of internal combustion engines, and more specifically to such devices operating on the basis of enriching the oxygen content of air taken in by the engine, and the method associated with their use.

2. Background Art

The use of denitrified air to reduce the content of toxic compounds from exhaust gases of automotive engines is known in the prior art. Nakajima et al., U.S. Pat. No. 3,817,232, for example, discloses the delivery of denitrified air, containing oxygen in a major proportion, to a carburetor of an internal combustion engine.

The disclosed apparatus, however, is applicable to an internal combustion engine only after major modifications in the engine structure. Moreover, the patented structure requires the use of two pumps, forming an integral part of the air intake system for the engine, along with an air denitrifying unit. The latter operates by using a nitrogen impermeable membrane, for example, or a specified molecular sieve formed of pulverized zeolite.

Such a structure is complex, expensive, requires major engine modification, and is thus not easily adaptable for use with older cars, subsequent to production and sale.

McKerahan, U.S. Pat. No. 1,339,211 discloses the use of a rotary concentrator for delivering oxygenated air at its output, in order to obtain a fuel saving by more complete combustion in smelting furnaces, blacksmith fires, steam boilers, gas engines and the like.

The disclosure, however, merely contemplates the use of centrifugal action to separate and concentrate oxygen. There is no disclosure of any readily available device to be used for such a concentrator. No suggestions are provided for reduction of output pollution with the aid of a static concentrator, nor is any indication provided for combining the device with carburetor intakes for automotive internal combustion engines in order easily and inexpensively to update an automotive engine to comply with pollutant emission standards.

In summary, the prior art requires complex devices having a number of moving parts for air oxygenation of internal combustion engines. The prior art thus fails to provide simple, inexpensive devices for pollution reduction in new and existing automobiles, and particularly fails to provide use of static gas separator structures for such applications.

SUMMARY AND OBJECTS OF THE INVENTION

It is accordingly an object of the present invention to overcome the difficulties of the prior art, and to provide an inexpensive device for reduction of pollutant emissions from automotive internal combustion engines.

It is a more specific object of the invention to provide a simple method and apparatus for retrofitting existing automobiles to comply with stricter emission standards therefor.

Yet another object of the invention is the provision of a static gas separator for use in conjunction with an air inlet for an automotive internal combustion engine in order to increase combustion efficiency and reduce pollutant emission thereby.

It is still a further object of the invention to provide a stationary, coaxial, multiconical structure in conjunction with an air inlet of an internal combustion engine to increase the operating efficiency and to decrease the pollutant emissions thereof.

In accordance with the foregoing and other objects of the invention, a frustoconical structure is utilized for reducing the nitrogen content and enriching the oxygen content of air provided for use in an internal combustion engine. The structure has no moving parts and may be mounted on newly produced or existing engines, and is useful to conserve fuel as well as to reduce the emission of pollutants by the engine.

When used with internal combustion engines for aeronautical use, the oxygen enriching structure disclosed herein further provides for increased flight ceilings and increased flight speeds.

Mounting structure is provided for connecting the separator to an air inlet of the engine, thereby to retrofit existing cars with the device for compliance with pollutant emission standards. The inventive gas separator may be simply attached to an inlet in an air horn for a carburetor breather, for example. Such use advantageously satisfies stricter emission standards without requiring the use of unleaded or high-octane gasoline.

The present invention further includes the method of using the above described structure by connecting the separator to an engine air inlet thereby to change the composition of air supplied to the engine.

BRIEF DESCRIPTION OF THE DRAWING

The foregoing and other objects, features and advantages of the invention will become more readily apparent upon reference to the following detailed description of the preferred embodiment, when taken in conjunction with the accompanying drawing in which like numbers refer to like parts.

DETAILED DESCRIPTION OF THE PREFERRED EMBODIMENT

Figure 1:
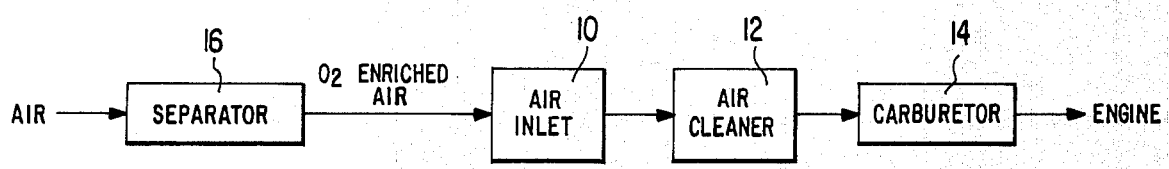
FIG. 1 shows, in simple block diagram form, an illustration of the broad concepts embodied by the present invention.

Referring now to the drawing, an apparatus for reducing pollutant emissions of an internal combustion engine as used on automotive vehicles, for example, is shown in FIG. 1. In the figure, standard components of an automotive internal combustion engine are shown as an air inlet 10, an air cleaner 12, and a carburetor 14.

As is known in the art, typical engines operate by mixture of a fuel with air in carburetor 14, the resulting charge being provided to the engine for timed detonation in a plurality of cylinders. It is also known to provide individually mixed charges for each of the individual cylinders in a system known as a gas injection engine. Since carburetion of the fuel does not form part of the present invention, it is seen that the block labelled carburetor in FIG. 1 may be replaced by a plurality of individual gas injection devices, each mixing and providing an individual charge for individual cylinders.

Whether a fuel injection or a carburetion system is used, however, a common feature is the need to obtain air, through an inlet 10, for mixing with the fuel. The air inlet supplies air to an air cleaner, for removal of particles harmful to the fuel injectors or carburetor, screening and filtering of the air prior to passage to the carburetor or fuel injectors.

The present invention provides a static gas separator 16, easily connected to inlet 10, for modifying the composition of the air supplied to the carburetor.

By separating heavier from lighter components of the incoming air, it is possible to separate the oxygen and nitrogen components thereof. The present invention contemplates using the separator to provide oxygen rich air to air inlet 10 for mixture with fuel in carburetor 14 and for combustion in the engine.

By removing nitrogen from the air supplied to the carburetor, the formation of oxides of nitrogen as products of combustion is reduced. If all the nitrogen is removed from the incoming air, no nitrogen oxides will be formed in combustion. Accordingly, an immediate benefit of the use of the separator 16 is the reduction, or elimination, of nitrogen oxides from the exhaust emissions of the engine. These oxides are undesirable by-products of the internal combustion process, and their production is tightly controlled under current regulations for limitation of automotive pollution.

A further advantage of the use of a separator as shown in the Figure is that, with oxygen enriched air, more complete combustion is obtained, thus reducing the quantities of hydrocarbons and carbon monoxide in the engine exhaust. Production of most of the undesirable pollutant emissions is thus reduced by use of the separator as contemplated herein.

Additionally, with more complete combustion of the fuel, an additional benefit of the present invention is that of increased fuel efficiency.

Moreover, use of the invention with aeronautical engines permits flights to ascend to heights beyond previous ceilings, inasmuch as the rarified air at the higher altitudes is oxygen enriched by the invention prior to combustion in the engine. Lower octane fuel may generally be used in engines utilizing the inventive separator, whether for land based or aeronautical use.

Figure 2:
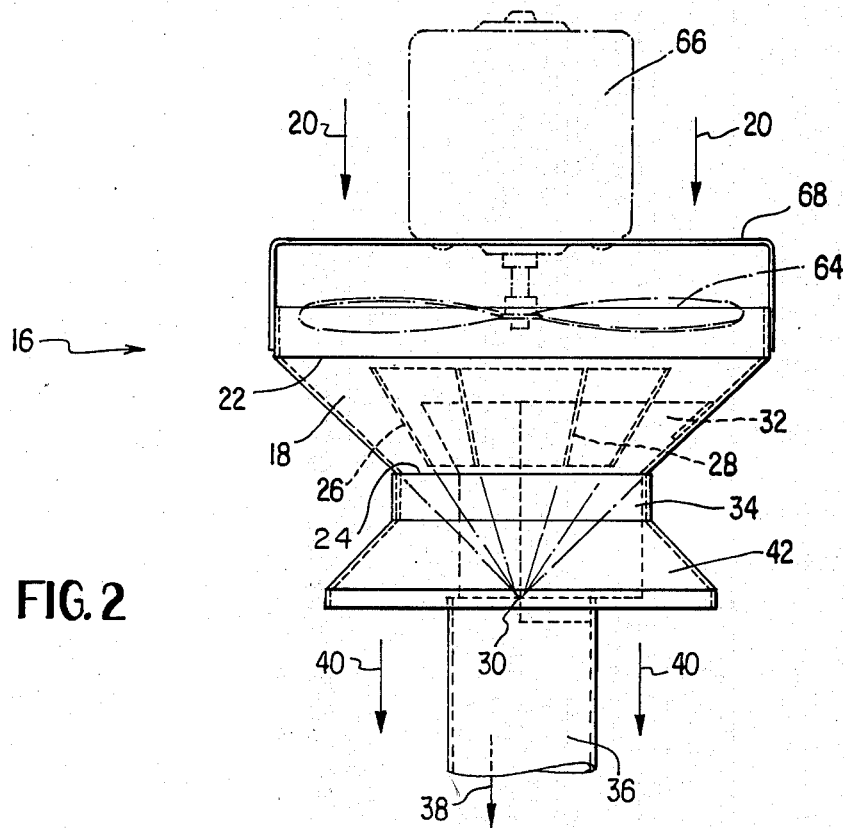
FIG. 2 shows a longitudinal view of the invention.
Figure 3:
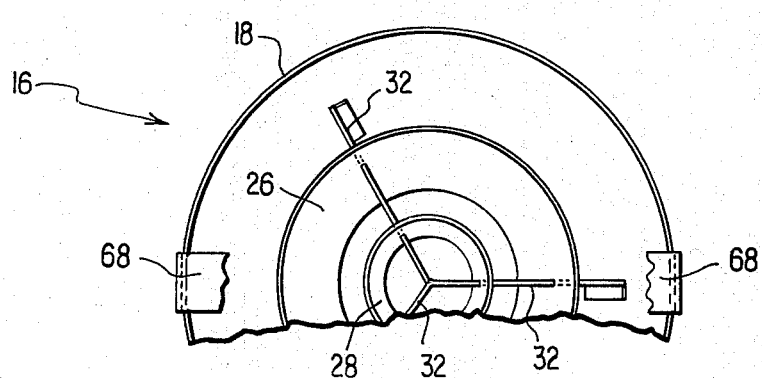
FIG. 3 shows a partial end view of the invention.

Referring now to FIGS. 2–3, the separator of FIG. 1 is generally shown at 16. The static structure is seen to include a tapered, frustoconical shape, provided by an outer shell 18. Arrows 20 are provided to indicate the general direction of air flow into the device.

Shell 18, which is formed as a frustum of a cone, includes a wide opening 22 and a narrow opening 24. The wide opening 22 acts as an inlet for the flowing air, and narrower opening 24 provides an outlet for the device. While the preferred embodiment described herein is shown as a right cylindrical frustoconical structure, other tapered shapes may also be used. The significant aspect of the structure is its narrower outlet when compared with its broad inlet.

In order to enhance the operative effect of the structure, a number of additional frustoconical elements are utilized. As seen in the Figures, elements 26 and 28 are each formed as a frustum of a cone, each disposed coaxially with shell 18. Additionally, the frustoconical elements 26 and 28 are preferably disposed so that a single point 30 is the apex for each truncated cone.

As further shown in FIG. 2, the wide openings of elements 26 and 28 are substantially coplanar with opening 22 of shell 18. The air flowing into the inlet of the separator thus encounters the effects of all of the cones simultaneously.

Similarly, the narrow openings of elements 26 and 28 are similarly coplanar with opening 24 of shell 18, to form the outlet of the device. The various openings need not, however, be coplanar as depicted for the preferred embodiment.

A plurality of baffles are placed in the structure, preferably regularly spaced as shown by baffles 32 which are spaced 120° apart. The baffles are used to support the structure, particularly to separate the various elements and to maintain a desired spacing therebetween, as shown at FIG. 2.

In addition to providing structural integrity for the static separator of the invention, the baffles also serve to direct the gas flow longitudinally from inlet to outlet. The longitudinal baffles thus serve to decrease turbulence in the air flowing through the device.

The plurality of frustoconical structures terminate at a collar 34 at their narrow ends, from which issues the gas shown as entering the structures by arrows 20. While the theory of operation of the device is not required to be disclosed, it is believed that the heavier constituent molecules of the entering fluid, upon colliding with the tapered sides of the device, are directed thereby towards the center of the outlet thereof, at 24. More specifically, the heavier molecules are directed towards the apex of the various conical structures, at 30. The lighter constituent molecules, upon such collisions, are similarly directed. However, during the random collisions which occur between the heavier and lighter molecules subsequent to such focusing of the fluid, the lighter molecules, having the lesser kinetic energy and momentum, are deviated from their paths, while the heavier molecules, having the greater kinetic energy and momentum, retain their velocities towards the apex at 30. As a result of such collisions, the lighter molecules exit the narrow opening at 24, and collar 34, having more randomly distributed velocities and directions, while the heavier molecules are primarily directed towards the center of the exit opening.

The exiting fluid is thus seen to have a greater concentration of its heavier molecular components at the center of the outflow, and a greater concentration of lighter molecular components at the periphery of the outflow.

An appropriately sized outlet tube 36, subtending an appropriate central portion of the outlet area, thus provides an outlet fluid stream at 38 which includes a greater concentration of the heavier molecular components than the outlet fluid stream at 40, emerging from the peripheral areas of outlet 24. In order to provide an unobstructed path for the outlet fluids, an inversely tapered section 42, coaxial with the tapered frustoconical shell 18 and elements 26, 28, is provided.

In the preferred embodiment, wherein the fluid passing through the device is a gas, and more specifically air, the heavier, central portion of the outlet stream includes a greater concentration of oxygen molecules, while the lighter, peripheral portion of the outlet stream includes a greater concentration of nitrogen molecules. Accordingly, the outlet stream 38, issuing from outlet tube 36, is oxygen enriched as compared to the concentration of oxygen in the inlet stream 20. Upon supplying the oxygenated stream issuing from outlet tube 36 to an internal combustion engine, the several advantages previously described accrue beneficially to the engine's operation.

It is understood, however, that a collecting tube, not shown, may be provided to gather the peripheral, lighter outlet stream issuing from section 42. Moreover, any number of central outlet tubes may be provided, each subtending a successively greater central area, thereby to provide successively lighter outlet streams separated from the inlet fluid stream. Such outlet tubes may be disposed as coaxial cylindrical members within the inversely tapered section 42 to collect the appropriately concentrated streams, with various conduits provided to convey the collected streams to their ultimate destinations.

It is understood that the entering size of outlet tube 36 is of significance in determining the concentration of heavier molecules in the fluid stream collected thereby. An appropriately sized conduit is connected to the orifice to convey the collected stream to a utilization device therefor.

Figure 4A:
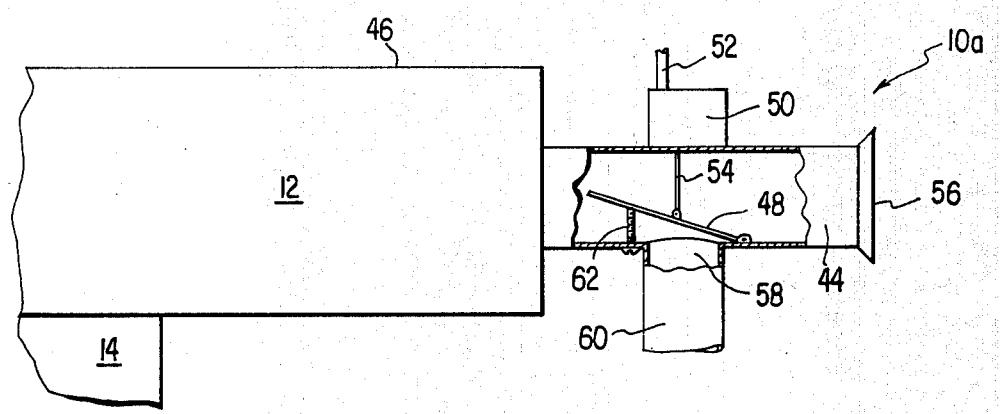
FIGS. 4a and 4b show two connections of the inventive separator to an automotive internal combustion engine.
Figure 4B:
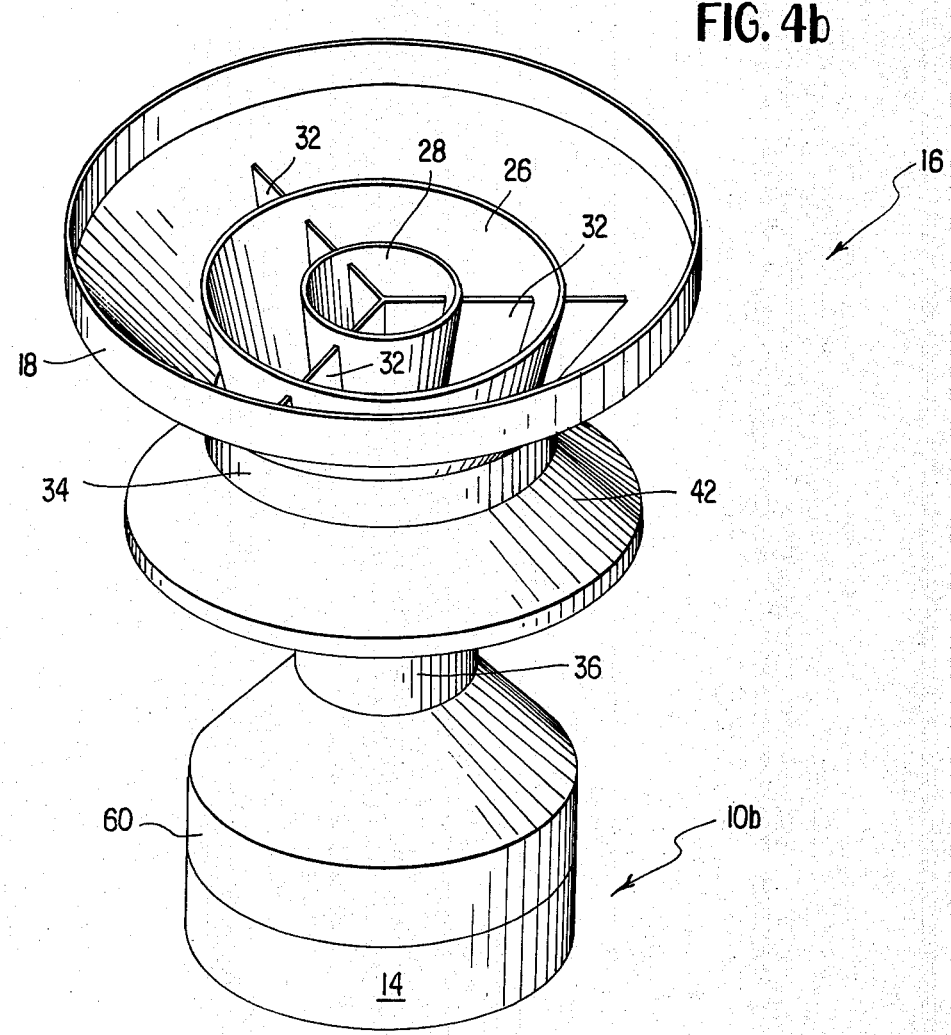

Referring now to FIGS. 4a and 4b, the air inlet 10 to an internal combustion engine is shown at 10a and 10b, respectively.

In FIG. 4a, the air inlet is shown as including an air horn 44 extending from an air cleaner container 46, typically mounted on a carburetor. A damper 48 is typically provided in such air horns, operated by a vacuum control 50 receiving engine vacuum via a hose 52. In operation, a push rod 54 is activated by control 50 in response to vacuum conditions of the engine to move damper 48, thereby to select varying mixtures of air from opening 56, receiving ambient air, and opening 58 at the bottom of horn 44, receiving heated air.

In the present embodiment, such a connection may be modified to receive at its bottom opening 58 a conduit 60, connected at its other end to outlet tube 36 of the present static separator. A set screw 62 is provided to determine the minimum position for damper 48, thereby to determine the minimal input concentration of oxygenated air to the engine. Preferably, damper 48 is positioned to provide only oxygenated air to the engine. Control 50 may be disconnected, and opening 56 may be effectively sealed. Alternatively, other controls may be provided to determine the setting of damper 48 in response to specific engine operating conditions, in which non-oxygenated air may be input through opening 56.

Referring now to FIG. 4b, an alternate connection of the inventive device to an engine air inlet 10b is shown. Specifically, the separator 16 provides an oxygenated outlet stream at outlet tube 36. Outlet tube 36 is connected to conduit 60, appropriately shaped for mounting directly onto the air inlet of carburetor 14.

Similar connections may be provided for mounting an oxygenating concentrator on a turbine engine, by appropriately sizing the conduit for proper connection thereto.

It is appreciated that to obtain greater quantities of oxygenated air, as may be required by larger engines, a plurality of such concentrator devices may be operated in tandem, with the streams collected by the various outlet tubes 36 thereof being combined for input to an engine. Alternatively, larger separators may be used, to provide greater outlet stream volumes from individual devices.

It is further understood that with greater inlet stream velocity, the heavier molecules in inlet stream 20 are possessed of greater momentum and kinetic energy. It is thus noted that the separation effect is more pronounced for faster flowing fluids than for slower flowing streams of fluid, since the heavier molecules are deviated still less from their focused orientation by collisions with lighter molecules. Accordingly, a fanlike arrangement is shown in phantom at FIG. 2.

A fan 64 may be placed in front of opening 22 of the device, the fan operated by an electric motor 66, for example.

In a specific application of the present static separator, a 1974 Chrysler Newport was modified by the addition of the device to reduce pollutant emission. The emissions of hydrocarbons, in parts per million, and percentages of carbon monoxide were measured at speeds of 500–600 RPM, representing idling conditions, and at speeds of 900–1000 RPM, representing operating speeds. The tests were conducted without the device, with the device, and finally with the device and a fan connected to impart added velocity to the incoming air stream. As expected, substantial improvements were shown in reduction of output pollutants. The results are summarized in Table I below.

TABLE I

| SEPARATOR: | OFF | ON | ON | OFF | ON | ON |
|---|---|---|---|---|---|---|
| FAN: | OFF | OFF | ON | OFF | OFF | ON |
| PARAMETER | | | | | | |
| RPM | | 900–1000 | | | 500–600 | |
| HC (ppm) | 259 | 39 | 13 | 351 | 367 | 42 |
| CO (%) | 1.99 | 0.48 | 0.05 | 3.13 | 2.05 | 0.32 |

As is apparent from the above results, substantial improvements in pollutant emissions are attained, with increased improvements for increased incoming air speed. The separator was mounted by a bracket 68, shown at FIG. 2, to receive air from the engine cooling fan. At increased engine speed, the air entry velocity is thus also increased. In every category, pollutant emissions were reduced with increased engine speed, and further reduced with the addition of an operating fan. Such a device, or any other device for generating air flow through the separator, may thus advantageously be used further to reduce pollutant emissions.

There has thus been described a fluid separating device, for separating a fluid stream into a plurality of streams having differing concentrations of heavier to lighter constituents thereof. The device includes an inlet and a narrower outlet, and a structure at the outlet for separating the outlet stream into its various components. The device structure may be tapered, and preferably is frustoconical in shape, and may include any number, 1, 2, ..., K of frustoconical elements therein.

The outlet separating structure for the outlet stream includes apparatus for separating a central portion of the outlet stream from a peripheral portion thereof. Any number of such separating structures may be used. Specifically, where K frustoconical elements are used, for example, there may be K separating devices, each including a coaxial inlet subtending a portion of the outlet stream. The subtended portion may correspond to one of the frustoconical elements, but need not necessarily do so. The separating structure further may include an inversely tapered device, to minimize the possibility of the lighter components recentralizing in the outlet stream.

In a specific use of the fluid separating device, a gas, such as air, is separated into outlet streams having greater and lesser concentrations of oxygen. Such a device is used in conjunction with an internal combustion engine to provide an enriched, oxygenated air flow thereto, resulting in increased efficiency of operation, reduced emission of pollutants, and reduced consumption of fuel.

The preceeding specification describes the preferred embodiment of the invention as an illustration and not a limitation thereof. It is appreciated that equivalent variations and modifications of the invention will occur to those skilled in the art. Such modifications, variations and equivalents are within the scope of the invention as recited with greater particularity in the appended claims, when interpreted to obtain the benefits of all equivalents to which the invention is fairly and legally entitled.

I claim:
1. A concentrator which comprises:
   (a) a plurality of concentric imperforate frustoconical sections of approximately the same height and having substantially the same projected apex,
   (b) baffles between and supporting the frustoconical sections,
   (c) an inlet end,
   (d) an outlet end,
   (e) an inversely-tapered immperforate frustoconical section and
   (f) an outlet tube,
   the concentric frustoconical sections having wider and narrower bases, the wider bases comprising the inlet end and lying substantially in one plane and the narrower bases comprising the outlet end and lying substantially in another plane parallel thereto;
   the baffles being spaced from each other and perpendicular to the frustoconical sections they support;
   the inversely-tapered section surrounding and being substantially concentric with the outlet tube and having its narrower end at the outlet end; and
   the outlet tube having an inlet at or immediately downstream of the projected apex.

2. A concentrator according to claim 1 in combination with a fan positioned to direct fluid toward and into the inlet end of the concentrator.

3. A combination according to claim 2 which comprises a motor to drive the fan and wherein the motor and fan are secured to the concentrator.

* * * * *